(12) United States Patent
Cimpoesu et al.

(10) Patent No.: US 11,565,671 B2
(45) Date of Patent: Jan. 31, 2023

(54) METHOD FOR MONITORING AN ELECTRIC MOTOR, ELECTRONIC CONTROL MODULE, HYDRAULIC BRAKE SYSTEM AND STORAGE MEDIUM

(71) Applicant: Continental Teves AG & Co. oHG, Frankfurt am Main (DE)

(72) Inventors: Albert Cimpoesu, Buruienesti (RO); Bogdan Budianu, Oberursel (DE); Eberhard Münz, Sandhausen (DE); Tom Kaufmann, Ippenschied (DE)

(73) Assignee: Continental Teves AG & Co. oHG

( * ) Notice: Subject to any disclaimer, the term of this patent is extended or adjusted under 35 U.S.C. 154(b) by 0 days.

(21) Appl. No.: 16/508,479

(22) Filed: Jul. 11, 2019

(65) Prior Publication Data

US 2020/0031324 A1 Jan. 30, 2020

(30) Foreign Application Priority Data

Jul. 25, 2018 (EP) ........................... 8465550
Aug. 30, 2018 (DE) .................. 10 2018 214 693.4

(51) Int. Cl.
*B60T 8/172* (2006.01)
*B60T 8/40* (2006.01)
*B60T 8/88* (2006.01)
*B60T 8/171* (2006.01)

(52) U.S. Cl.
CPC .............. *B60T 8/172* (2013.01); *B60T 8/171* (2013.01); *B60T 8/4022* (2013.01); *B60T 8/885* (2013.01)

(58) Field of Classification Search
CPC ...................................... B60T 17/221
See application file for complete search history.

(56) References Cited

U.S. PATENT DOCUMENTS

| 9,944,267 | B2 | 4/2018 | Huang et al. | |
| 2010/0308645 | A1* | 12/2010 | Maron | B60T 13/746 303/20 |
| 2017/0297549 | A1* | 10/2017 | Huang | B60T 17/221 |
| 2018/0056959 | A1* | 3/2018 | Pennala | B60T 7/042 |
| 2018/0201243 | A1* | 7/2018 | Pennala | B60T 8/1701 |

FOREIGN PATENT DOCUMENTS

| DE | 102017107849 A1 | 10/2017 |
| DE | 102018101123 A1 | 7/2018 |

OTHER PUBLICATIONS

German Search Report for German Application No. 10 2018 214 693.4, dated Jul. 19, 2019 with partial translation, 11 pages.
Korean Decision for Grant of Patent for Korean Application No. 10-2019-0086525, dated Mar. 22, 2021, with translation, 3 pages.

* cited by examiner

*Primary Examiner* — Imran K Mustafa
(74) *Attorney, Agent, or Firm* — RatnerPrestia

(57) ABSTRACT

A method for monitoring an electric motor of a hydraulic brake system for a motor vehicle, wherein a first torque and a second torque are calculated and compared with one another. A fault can be detected on the basis of the comparison. The invention also relates to an associated electronic control module, to an associated hydraulic brake system and to an associated non-volatile computer-readable storage medium.

14 Claims, 2 Drawing Sheets

METHOD FOR MONITORING AN ELECTRIC MOTOR, ELECTRONIC CONTROL MODULE, HYDRAULIC BRAKE SYSTEM AND STORAGE MEDIUM

CROSS REFERENCE TO RELATED APPLICATIONS

This application claims priority to German Patent Application No. 10 2018 214 693.4, filed Aug. 30, 2018, and European Patent Application No. EP18465550, filed Jul. 25, 2018, the contents of such applications being incorporated by reference herein.

FIELD OF THE INVENTION

The invention relates to a method for monitoring an electric motor of a hydraulic brake system for a motor vehicle. The invention also relates to an associated electronic control module, to an associated hydraulic brake system and to an associated storage medium.

BACKGROUND OF THE INVENTION

In electrohydraulic brake systems, a pressure in a hydraulic circuit is typically generated at least partially by an electric actuator. The latter contains, for example, an electric motor, a piston and a spindle drive for driving the piston by means of the electric motor. Such arrangements are also referred to as linear actuators (LAC=linear actuator). The generated pressure can be conducted via various lines and valves to wheel brakes where it can bring about a braking effect. The pressure within a linear actuator is typically measured and monitored by a pressure sensor.

Owing to the relevance of a brake system to safety, it is typically necessary in a motor vehicle to monitor the state of a pressure generator as described above. It may be the case, for example, that a linear actuator is blocked or has too much friction. In both cases it may be the case that the braking effect can no longer be generated as desired, which can constitute a considerable safety risk for the respective vehicle.

In the prior art it is known to implement a pressure-deviation monitoring process which compares a desired pressure with an actually present pressure. As a result, although faults can be detected, it has been found that this procedure has disadvantages. For example, a pure pressure comparison does not provide any indication of the underlying problem, and furthermore such a pressure comparison can be carried out only in the case of an activation of the brake system. This means that a fault in the brake system is detected at the actual time when braking is necessary.

SUMMARY OF THE INVENTION

Therefore, an aspect of the invention is a method for monitoring an electric motor, which, in comparison with the prior art, is executed in an alternative manner, for example in a better way. Furthermore, aspects of the invention are to provide an associated control module, an associated hydraulic brake system and an associated storage medium.

This is achieved according to an aspect of the invention by means of a method, a control module, a brake system and a storage medium according to the respective main claims. Advantageous refinements can be found, for example, in the respective dependent claims. The content of the claims is incorporated in the content of the description by express reference.

An aspect of the invention relates to a method for monitoring an electric motor of a hydraulic brake system for a motor vehicle. The method has the following steps:
  calculating a first torque of the motor,
  calculating a second torque of the motor,
  detecting a malfunction on the basis of a comparison of the first torque and of the second torque.

By means of the torque comparison described herein it is possible to detect faults better and in more situations than was possible in the case of pressure comparisons according to the prior art. It is to be understood that the first torque and the second torque are calculated variables which are typically calculated in different ways. As a result, a deviation between these two calculated variables can occur. A deviation between the two calculated variables can typically indicate a malfunction.

Instead of monitoring an electric motor, it is also possible to speak of monitoring a controller of an electric motor.

The first torque can preferably be a motor load torque. The first torque can be calculated, in particular, on the basis of an electrical motor torque, a moment of inertia and a motor angular acceleration. The electrical motor torque is here that torque which would arise owing to an electrical supply of the motor when there is no load. The moment of inertia is typically the moment of inertia of the system which drives the motor, including the motor itself. The motor angular acceleration is typically the angular acceleration which is generated by the motor, that is to say, for example, the second time derivative of the angle of its shaft.

The first torque can be calculated, in particular, as follows: the electrical motor torque minus the moment of inertia multiplied by the motor angular acceleration. This has proven to be a simple and reliable type of calculation. It is to be understood that with respect to such information for calculation it is necessary to bear in mind the basic rule "multiplication and division before addition and subtraction".

The motor angular acceleration can be extracted, in particular, by an observer. Possible designs are known in the prior art. The motor angular acceleration can alternatively be calculated, for example, by means of an angle sensor with formation of the second time derivative or by means of an angular speed sensor with formation of the first derivative.

The second torque is preferably calculated at least partially on the basis of a measured hydraulic pressure. As a result, the hydraulic pressure can be used as a measure which is to be generated by the electric motor and which is ultimately decisive for the functionality of the brake system.

The second torque can be calculated, in particular, at least partially on the basis of a measured hydraulic pressure, a transmission ratio, an area of a linear actuator piston which is driven by the motor and an efficiency constant. This has proven to be a simple and reliable method of calculation. The efficiency constant is here, in particular, a constant which specifies the efficiency of the system and can be determined, for example, experimentally or by simulation or some other type of calculation. The transmission ratio is typically that between the motor and the linear actuator piston.

The second torque can be calculated, in particular, as follows: the product of the efficiency constant, the area of a linear actuator piston which is driven by the motor, the transmission ratio and the measured hydraulic pressure, divided by 2 and by n. This formula reliably represents that torque which was applied to generate the actually measured pressure. This permits an appropriate comparison with the first torque which is typically that torque which is to be generated on the basis of the design and the operating parameters of the motor. In particular, in the configuration described herein, the determination that the second torque is significantly lower or at all lower than the first torque can indicate a malfunction.

The comparison preferably comprises the following:
calculating a difference between the first torque and the second torque,
comparing the difference with a predetermined threshold value, and
detecting a malfunction if the difference exceeds the predetermined threshold value.

By means of such a comparison it is easily possible to determine whether there is a deviation between the first torque and the second torque. When a threshold value is exceeded, a malfunction can be assumed.

The method can preferably be executed if the motor is actuated by an electronic control module, to be precise without taking into account a user activation of a brake pedal or an activation request by a function which is executed in the electronic control module. It has become apparent that the method which is described herein and which is based on a torque comparison can be used independently of an actual braking operation, so that checking is also possible, for example, at predefined times or after predefined intervals. This solves, in particular, the problem that in designs according to the prior art checking was possible only when braking was actually carried gut, wherein in this case there could already be safety-relevant problems if the malfunction was only detected during the braking operation and the vehicle could not be braked correctly.

An aspect of the invention further relates to an electronic control module, which is configured to execute a method according to an aspect of the invention. In this context, it is possible to revert to all the embodiments and variants described herein. An aspect of the invention also relates to a hydraulic brake system for a vehicle, wherein the brake system has the following:
a linear actuator piston for generating hydraulic pressure,
an electric motor which is designed to drive the linear actuator piston,
a pressure sensor for measuring the hydraulic pressure, and
an electric control module which is configured to drive the electric motor, to receive the measured pressure and to execute a method according to an aspect of the invention.

With respect to the method according to an aspect of the invention, it is possible to revert to all of the embodiments and variants described herein. The advantages further described above can therefore be implemented for a hydraulic brake system.

An aspect of the invention also relates to a non-volatile computer-readable storage medium which contains instructions which, when executed by an electronic control module, cause the electronic control module to execute a method according to an aspect of the invention. With respect to the method according to an aspect of the invention, it is possible to revert to all of the embodiments and variants described herein.

BRIEF DESCRIPTION OF THE DRAWINGS

Further features and advantages will be gathered by a person skilled in the art from the exemplary embodiment described below with reference to the appended drawing. In the drawing.

DETAILED DESCRIPTION OF THE PREFERRED EMBODIMENTS

Figure 1:
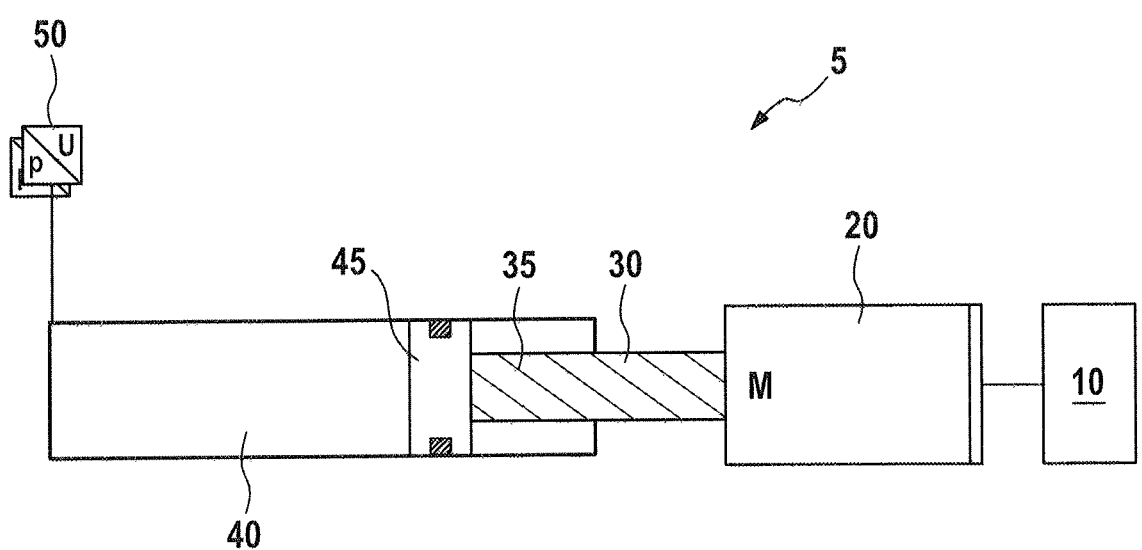
FIG. 1 shows a hydraulic brake system.

FIG. 1 shows a hydraulic brake system 5 according to an exemplary embodiment of the invention.

The hydraulic brake system 5 has an electronic control module 10 according to an exemplary embodiment of the invention. This is designed, in particular, to execute a method according to an aspect of the invention. This will be discussed in more detail later on.

The hydraulic brake system 5 has an electric motor 20 which is actuated by the electronic control module 10.

The hydraulic brake system 5 has a shaft 30 which is driven by the motor 20 and has an external thread 35.

The hydraulic brake system 5 has a linear actuator 40 in which a piston 45 is arranged. The piston 45 is a linear actuator piston and is connected to the shaft 30 in such a way that when the shaft 30 rotates said piston can be moved owing to the external thread 35 and an internal thread (not illustrated) located within the piston 45 in the linear actuator 40.

The hydraulic brake system 5 also has a pressure sensor 50 which senses a pressure in the linear actuator 40.

The electronic control module 10 is designed to calculate a first torque and a second torque. For the first torque this is done according to the following formula:

$$M_1 = M_e - J * \frac{d\omega}{dt}$$

where
$M_1$ refers to the first torque,
$M_e$ refers to an electrical motor torque which is determined on the basis of operating parameters of the motor 20,
J refers to a moment of inertia of the system which is driven in its entirety by the motor 20, that is to say in particular the shaft 39 and rotatable components of the motor 20 which are connected thereto,
$\omega$ refers to the angular speed of the shaft 30.

The formula specified above therefore calculates the first torque $M_1$ in such a way that the torque which occurs owing to the angular acceleration of rotatable parts is subtracted from the electrical torque which would typically arise in the load-free state.

Figure 2:
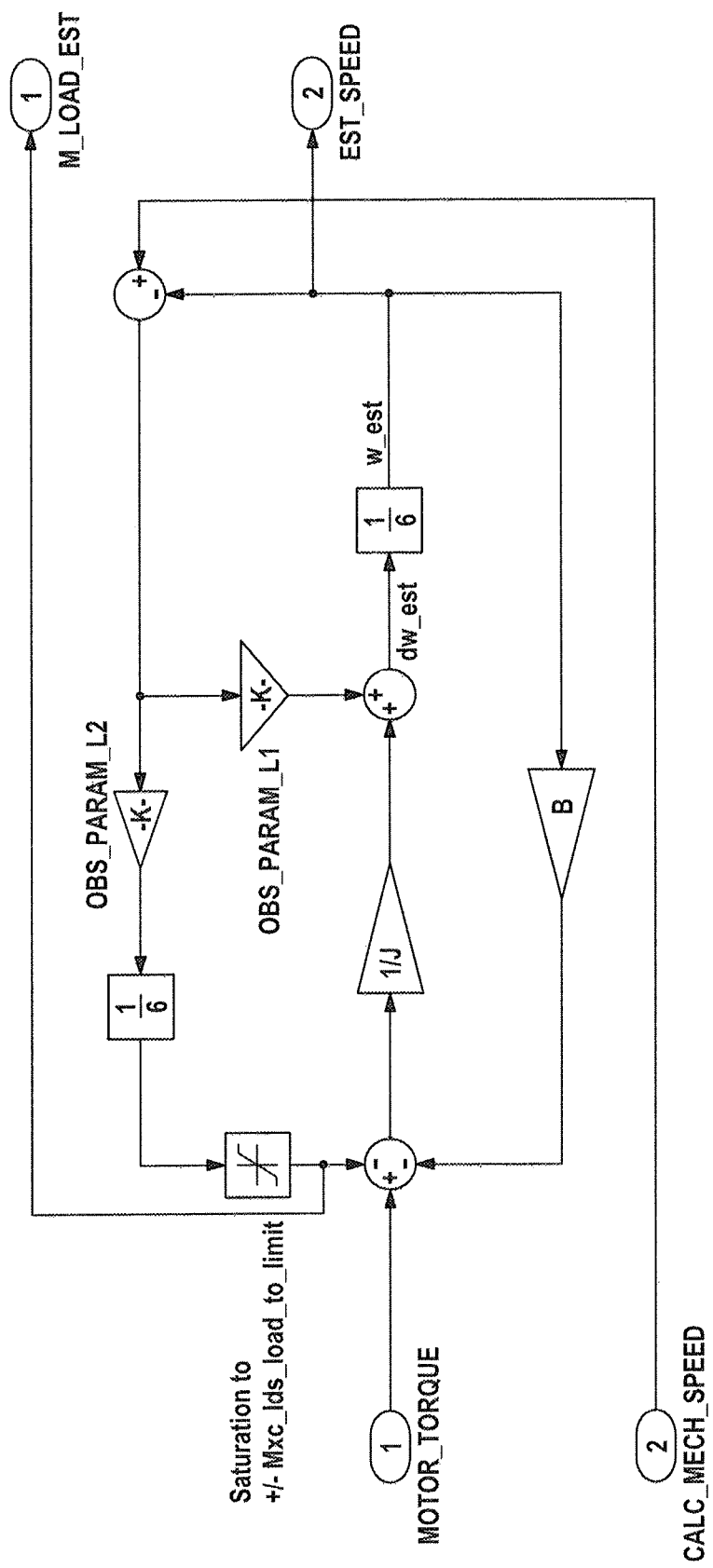
FIG. 2 shows an observer.

The angular acceleration $$M_2 = \frac{\eta * A * k}{2 * \pi} * p$$

can be obtained, for example, by means of an observer which is illustrated in FIG. 2. Details are not given on this circuit here in the description, but instead reference is made to the illustration in the circuit diagram. In particular, on the left, at the point marked by 1 a motor torque is input, and at the point marked by 2 a calculated mechanical speed is input. On the right, at a point 1 an estimated load torque is output, and at point 2 an estimated speed is output.

The electronic control module 10 is also designed to calculate a second torque on the basis of the following formula:

$$\frac{d\omega}{dt}$$

where:
$M_2$ refers to the second torque,
η refers to an efficiency constant which represents an efficiency level of the system and which can be direction-dependent,
A refers to the area of the piston 45 in the linear actuator 40, i.e. the area which generates a pressure in the linear actuator 40,
k refers to the gradient of the external thread 35,
p refers to the pressure which is measured by the pressure sensor 50.

The second torque is therefore a torque which is recalculated on the basis of the actually generated pressure.

After calculating the two torques $M_1$, $M_2$, the electronic control module 10 compares them with one another. For this purpose, the second torque $M_2$ is subtracted from the first torque $M_1$. The value which is obtained for the difference is compared with a predetermined threshold value. If the difference is greater than this threshold value, a malfunction is detected, since the motor has clearly generated significantly less torque than would be possible based on its design and its electrical actuation. This can indicate, in particular, increased friction or other problems. On the other hand, if the difference is below the threshold value, it is assumed that a malfunction is not present.

It is to be understood that other possible sources of faults, such as for example faults in calculating amplification of a current measurement, an offset in a rotor position or even a fault in the pressure sensor 50 can influence the calculation. However, such faults can be detected with techniques which are known to a person skilled in the art, to be precise typically significantly more quickly than the detection of a fault in the motor or in the brake system on the basis of a comparison of torques, as described herein.

The torque comparison described herein can be carried out, in particular, continuously and/or at defined times, which can occur, in particular, independently of the activation of a brake pedal by a user or some other way of triggering the brakes. This significantly increases the reliability when detecting faults.

The mentioned steps of the method according to an aspect of the invention can be executed in the indicated order. However, they can also be executed in a different order as far as this is technically appropriate. In one of its embodiments, for example with a specific combination of steps, the method according to an aspect of the invention can be executed in such a way that no further steps are executed. However, in principle, further steps can also be executed, even steps of a kind which have not been mentioned.

The claims that are part of the application do not represent any dispensing with of the attainment of further protection.

If it turns out in the course of the method that a feature or a group of features is not absolutely necessary, the applicant aspires right now to formulate at least one independent claim which no longer has the feature or the group of features. This may be, by way of example, a subcombination of a claim available on the filing date or may be a subcombination of a claim available on the filing date that is limited by further features. Claims or combinations of features of this kind requiring rewording are intended to be understood to be covered by the disclosure of this application as well.

It should further be pointed out that configurations, features and variants of aspects of the invention that are described in the various embodiments or exemplary embodiments and/or shown in the figures are combinable with one another in any way. Single or multiple features can be interchanged with one another in any way. Combinations of features arising therefrom are intended to be understood to be covered by the disclosure of this application as well.

Back-references in dependent claims are not intended to be understood as dispensing with the attainment of independent substantive protection for the features of the back-referenced subclaims. These features can also be combined with other features in any way.

Features that are disclosed only in the description or features that are disclosed in the description or in a claim only in conjunction with other features may fundamentally be of independent significance essential to aspects of the invention. They can therefore also be individually included in claims for the purpose of distinction from the prior art.

The invention claimed is:

1. A method for monitoring an electric motor of a hydraulic brake system for a motor vehicle, wherein the method comprises:
   determining a motor angular acceleration during operation of the electric motor;
   calculating a first torque of the motor during operation of the electric motor on the basis of one or more first values, the one or more first values including the motor angular acceleration,
   measuring a hydraulic pressure of the hydraulic brake system with a pressure sensor;
   calculating a second torque of the motor during the operation of the electric motor on the basis of one or more second values different from the one or more first values, the one or more second values including the measured hydraulic pressure, and
   detecting a malfunction on the basis of a comparison of the first torque and of the second torque.

2. The method as claimed in claim 1, wherein the first torque is a motor load torque.

3. The method as claimed in claim 1, wherein the first torque is calculated on the basis of an electrical motor torque, a moment of inertia and the motor angular acceleration.

4. The method as claimed in claim 3 wherein the first torque is calculated as follows:
   the electrical motor torque minus the moment of inertia multiplied by the motor angular acceleration.

5. The method as claimed in claim 3, wherein the motor angular acceleration is extracted by an observer.

6. The method as claimed in claim 1, wherein the second torque is calculated on the basis of at least each of the measured hydraulic pressure, a transmission ratio, an area of a linear actuator piston which is driven by the motor, and an efficiency constant.

7. The method as claimed in claim 6, wherein the second torque is calculated as follows:
   the product of the efficiency constant, the area of a linear actuator piston which is driven by the motor, the transmission ratio and the measured hydraulic pressure, divided by 2 and by n.

8. The method as claimed in claim 1,
wherein the comparison comprises the following:
calculating a difference between the first torque and the second torque,
comparing the difference with a predetermined threshold value, and
detecting a malfunction if the difference exceeds the predetermined threshold value.

9. The method as claimed in claim 1, wherein the method is executed if the motor is actuated by an electronic control module, without taking into account a user activation of a brake pedal or an activation request by a function which is executed in the electronic control module.

10. An electronic control module comprising a non-volatile computer-readable storage medium which contains instructions which, when executed by the electronic control module, cause the electronic control module to execute a method for monitoring an electric motor of a hydraulic brake system for a motor vehicle, including:
determining a motor angular acceleration during operation of the electric motor;
calculating a first torque of the motor during operation of the electric motor on the basis of one or more first values, the one or more first values including the motor angular acceleration,
measuring a hydraulic pressure of the hydraulic brake system with a pressure sensor;
calculating a second torque of the motor during the operation of the electric motor on the basis of one or more second values different from the one or more first values, the one or more second values including the measured hydraulic pressure, and
detecting a malfunction on the basis of a comparison of the first torque and of the second torque.

11. A hydraulic brake system for a vehicle, wherein the brake system comprises:
a linear actuator piston for generating hydraulic pressure,
an electric motor which is designed to drive the linear actuator piston,
a pressure sensor for measuring the hydraulic pressure, and
an electric control module as claimed in claim 10.

12. A non-volatile computer-readable storage medium which contains instructions which, when executed by an electronic control module, cause the electronic control module to execute a method for monitoring an electric motor of a hydraulic brake system for a motor vehicle, including:
determining a motor angular acceleration during operation of the electric motor;
calculating a first torque of the motor during operation of the electric motor on the basis of one or more first values, the one or more first values including the motor angular acceleration,
measuring a hydraulic pressure of the hydraulic brake system with a pressure sensor;
calculating a second torque of the motor during the operation of the electric motor on the basis of one or more second values different from the one or more first values, the one or more second values including the measured hydraulic pressure, and
detecting a malfunction on the basis of a comparison of the first torque and of the second torque.

13. The method as claimed in claim 2, wherein the first torque is calculated on the basis of an electrical motor torque, a moment of inertia and a motor angular acceleration.

14. The method as claimed in claim 4, wherein the motor angular acceleration is extracted by an observer.

* * * * *